US012597324B2

(12) United States Patent　　(10) Patent No.:　US 12,597,324 B2
　　Gruber　　　　　　　　　　　(45) Date of Patent:　　　Apr. 7, 2026

(54) INTRUSION DETECTION SYSTEM, APPARATUS AND METHOD

(71) Applicant: Universal Electronics Inc., Scottsdale, AZ (US)

(72) Inventor: Brandon Gruber, San Marcos, CA (US)

(73) Assignee: Universal Electronics, Inc, Scottsdale, AZ (US)

( * ) Notice: Subject to any disclaimer, the term of this patent is extended or adjusted under 35 U.S.C. 154(b) by 0 days.

(21) Appl. No.: 18/763,152

(22) Filed: Jul. 3, 2024

(65) Prior Publication Data

US 2026/0011225 A1　　Jan. 8, 2026

(51) Int. Cl.
G08B 13/08　　(2006.01)
G06T 7/20　　(2017.01)

(52) U.S. Cl.
CPC ............... G08B 13/08 (2013.01); G06T 7/20 (2013.01)

(58) Field of Classification Search
None
See application file for complete search history.

(56) References Cited

U.S. PATENT DOCUMENTS

| | | | | |
|---|---|---|---|---|
| 4,507,654 A | * | 3/1985 | Stolarczyk | ............. G08B 13/08 |
| | | | | 340/556 |
| 4,709,153 A | * | 11/1987 | Schofield | ............... G08B 29/04 |
| | | | | 250/353 |
| 4,812,810 A | | 3/1989 | Query | |
| 6,787,784 B1 | | 9/2004 | Okunuki | |
| 2005/0128068 A1 | | 6/2005 | Winick | |
| 2013/0258110 A1 | * | 10/2013 | DeMarco | ............... G08B 25/14 |
| | | | | 340/517 |
| 2019/0096202 A1 | | 3/2019 | Seelman | |

OTHER PUBLICATIONS

International Search Report and Written Opinion of international application No. PCT/US2025/036014, dated Sep. 2, 2025, 15 pp.

* cited by examiner

*Primary Examiner* — John F Mortell
(74) *Attorney, Agent, or Firm* — Greenberg Traurig, LLP

(57)　　　　ABSTRACT

A system, method and apparatus is described, for monitoring entry doors and windows for unauthorized entry. Passive objects are installed onto movable portions of doors and windows in the structure. An optical base station is mounted to a wall or ceiling of the structure in view of at least some of the passive objects. The passive objects are configured to reflect visible and/or infrared light and, in some cases, comprise a unique, geometric shape. The optical base station monitors the passive objects and when a passive object is moved, for example, when a door or a window is open, the optical base station senses the movement and, in response, transmits an alarm signal to a security system central controller, which may then cause a security response to occur.

14 Claims, 4 Drawing Sheets

Differentiate b/w Objects — 316

Generate Alarm Signal(s) — 318

Transmit Alarm Signal(s) to Security Controller or to Security Device(s) — 320

INTRUSION DETECTION SYSTEM, APPARATUS AND METHOD

BACKGROUND

I. Field of Use

The present application relates to the field of security systems. More specifically, the present application relates to an improved system, method and apparatus for detecting unauthorized intrusion into structures, such as homes and businesses.

II. Description of the Related Art

Security systems for homes and businesses have been around for many years. Often, these systems make use of a number of door and window sensors for detecting unauthorized entry into structures, such as homes and businesses. When a door or window monitored by a sensor is opened, and a security system is in an armed state, the sensor transmits an indication of such to a local, central monitoring device, which then causes an security response to occur, i.e., causing a loud siren to sound or contacting a remote monitoring facility.

One problem with prior art security systems is that oftentimes, a large number of door and window sensors are needed in order to monitor each and every door of a home or business. This drives up the cost of security systems themselves, as well as the time and associated cost to install a large number of sensors.

Another problem with prior art security systems is that many people consider door and window sensors to be unsightly, especially in high-end homes.

Another problem with prior art security systems is that batteries are typically required to power the door and window sensors. Not only are batteries relatively expensive, but when they expire, it is typically inconvenient to replace them.

Yet another problem with prior art security systems is that magnets used for typical door and window sensors are becoming more difficult to procure and also significantly more expensive, especially in relation to the overall cost of a sensor.

SUMMARY

The embodiments described herein relate to methods, systems, and apparatus for monitoring entry doors and windows for unauthorized entry. In one embodiment, a system is described, comprising a passive object configured for installation onto an entry door, the passive object comprising a property that allows the optical base station to visually identify the passive object, and a optical base station is configured for visually monitoring the passive object and for determining when the passive object has moved.

In another embodiment and optical base station is described for monitoring entry doors and windows for unauthorized entry, comprising an optical sensor configured to generate electronic signals indicative of a viewing area of the optical sensor, a processor, coupled to the optical sensor, configured to receive the electronic signals from the optical sensor and to determine, based on the electronic signals, a presence of a passive object in the viewing area of the optical sensor and further configured to determine, based on the electronic signals, when the passive sensor has moved.

In yet another embodiment, a method is described, performed by an optical base station, for monitoring entry doors and windows for unauthorized entry, comprising generating, by an optical sensor of the optical base station, electronic signals indicative of a viewing area of the optical sensor providing the electronic signals to a processor of the optical base station determining, based on the electronic signals, a presence of a passive object in the viewing area of the optical sensor and determining, based on the electronic signals, when the passive sensor has moved.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to embodiments of a system, method and apparatus for monitoring entry doors and windows for unauthorized entry as part of a security system. A plurality of passive objects is installed on to entry doors and windows of a structure monitored by the security system. Each of the passive objects may be uniquely identifiable by a particular shape of each passive object. An optical base station is mounted in a location where a plurality of the passive objects is mounted. The optical base station is configured to detect a presence of each passive object in view of the optical base station and further configured to determine when any of the passive objects move i.e., as a door or a window is opened or closed. When movement is detected, the optical base station may transmit an alarm signal to a security system central controller which, in turn, may cause a security response to occur to warn occupants or remote persons that an unauthorized intrusion may have occurred.

Figure 1:
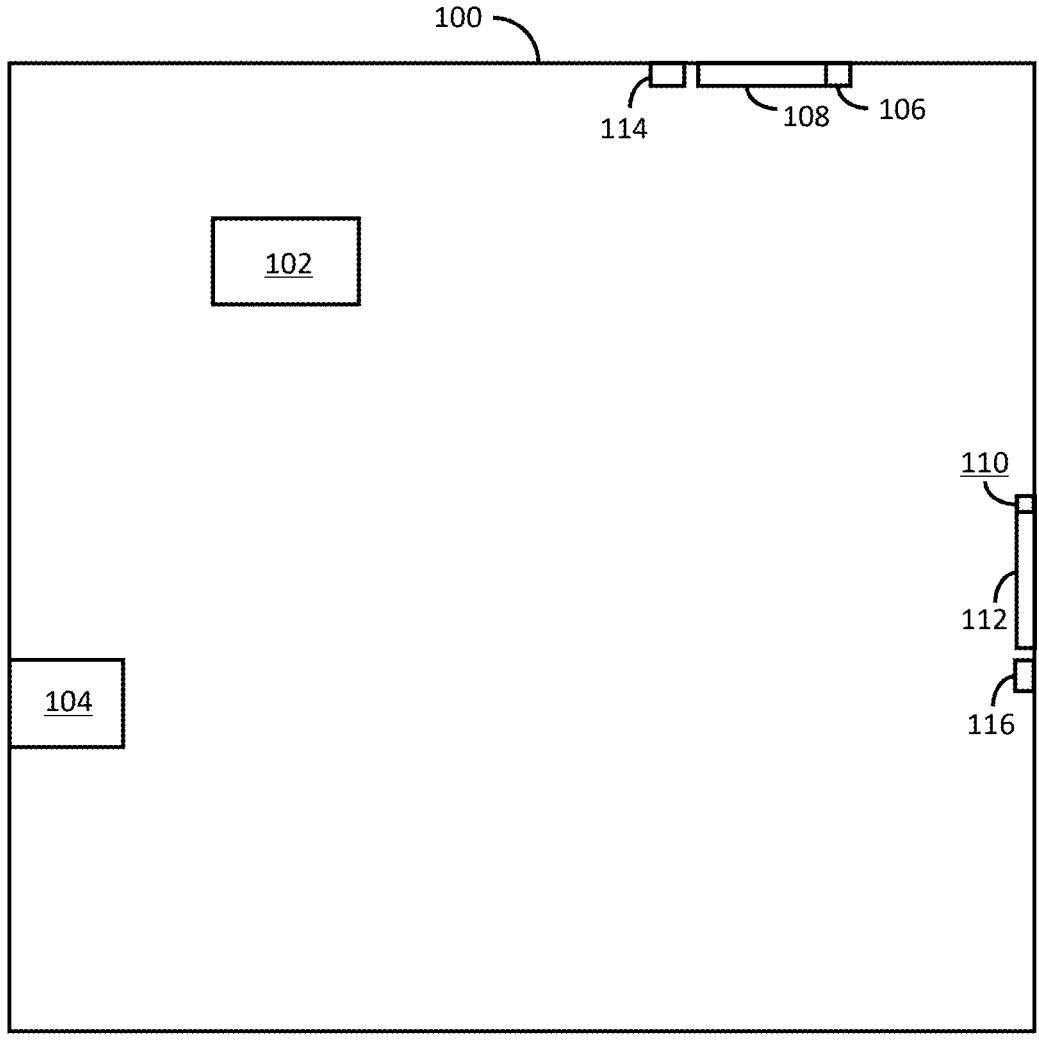
FIG. 1 is a simplified, top, plan view of a structure monitored by a security system comprising a security system central controller, an optical base station and a plurality of passive objects mounted to entry doors and windows of the structure.

FIG. 1 is a simplified, top, plan view of a structure 100, such as a home or business, monitored by a security system comprising a security system central controller 102, an optical base station 104 and a plurality of passive objects mounted to entry doors and windows of structure 100. As an example, FIG. 1 shows a first passive object 106 mounted to an entry door 108 and a second passive object 110 mounted to a movable portion of window 112. In practice, many more passive objects are used to monitor other entry doors or windows of structure 100, respectively. As used herein, the term "security system central controller" may refer to security system central controller 102, optical base station 104 and the plurality of passive objects, in this example, passive object 106 and 110, collectively. In other cases, a security system may refer only to security system central controller 102.

Also shown in FIG. 1 are battery-powered sensors 114 and 116, mounted to entry door 108 and window 112, respectively. These sensors are used in some embodiments to provide additional verification that a door or a window has been opened as reported by optical base station 104.

Passive objects 106 and 108 each comprise an object that does not consume power and comprises a material and/or shape that is visually detectable by optical base station 104. "Visually" meaning in the visible spectrum or infrared spectrum of light. For example, either passive object may comprise a section of infrared tape, in one embodiment, 1 inch square in size, and affixed to door 108 via the adhesive properties of the tape. In another embodiment, either passive object may comprise a "chip", "token" or some other typically small, typically thin object mountable to door 108 or window 112 via traditional methods such as in adhesive applied to one side of a passive object. In one embodiment, each passive object may comprise a different geometric shape. For example, in one embodiment, passive object 106 may comprise a small, thin square-shaped object, while passive object 110 may comprise a small, thin circular-shaped object. Other geometric shapes are possible, such as a triangle, oval, star-shape, hexagon, octagon, other polygon, etc.

Are mounted to entry door 108 and a movable portion of window 112, respectively. Each object is mounted such that it is viewable by optical base station 104. For example, passive object 106 may be affixed to a surface of a movable portion of door 108, inside, near the top of the movable portion away from hinges of door 108. By mounting passive object 106 in this manner, when door 108 is opened, passive object 106 will move in an arc far larger than if it were mounted at a location on the movable portion closer to where the hinges are located. This is desirable, because this makes passive object 106 more detectable by optical base station 104.

Similarly, passive object 108 is mounted to a movable portion, or "sash", of window 112 so that it is viewable by optical base station 104.

Security system central controller 102 comprises a home security panel, gateway, hub or some other device that monitors optical base station 104 and, in some embodiments, traditional, battery-powered, wireless security sensors installed on the doors and windows of structure 100, motion detectors, glass break detectors, etc. Security system central controller 102 is similar to a GC3 Security & Control panel sold by Nortek Security and Control, Inc., a base station sold as part of an alarm security kit by Ring, Inc., a Pulse® interactive touch screen panel sold by ADT, Inc., etc. In other embodiments where security system central controller 102 comprises a hub or gateway, the functionality of a security panel may be performed by a remote security server accessible via the Internet. In the remaining disclosure, any reference to security system central controller 102 may include reference to home security panels, hubs, gateways or such remote security servers.

Security system central controller 102 monitors alarm signals transmitted by optical base station 104 and, in some embodiments, may transmit status messages to optical base station 104 regarding a present operating mode of the security system/security system central controller 102. Status messages may be transmitted upon a change of the mode of operation, i.e., when a user leaves structure 100 and places the security system/security system central controller 102 into an armed-away mode of operation. Other modes of operation comprise an armed-home mode, where optical base station 104 is monitored for alarm signals but any interior motion detectors are not monitored, and an off mode, where the security systems/security system central controller 102 does not react to any incoming alarm signals from optical base station 14 or any other traditional security sensors.

When the security system/security system central controller 102 is in one of the armed-homes mode or armed-away mode, i.e., an "armed" mode, the security system/security system central controller 102 may cause a security response to occur when an alarm signal is received from optical base station 104 and/or any traditional security sensors. An "security response" may comprise causing a security siren within structure 100 to emit a loud, piercing sound designed to scare away any intruders, causing a strobe light located inside and/or outside structure security system central controller 102 flash brightly and/or to contact a remote monitoring station, commonly known in the art, alerting the remote monitoring station of a potential break-in so that the remote monitoring station may dispatch authorities to structure 100.

Optical base station 104 comprises a small, consumer-grade electronic device that can be mounted to a wall or ceiling of structure 100. Optical base station 104 is mounted such that it can visually locate one or more passive objects mounted to doors and windows of structure 100. Ideally, optical base station 104 is installed in a location such that it can view a number of passive objects simultaneously.

Optical base station 104 comprises an optical sensor, such as a camera, infrared transceiver, or some other well-known device for receiving visible, infrared or some other band of light. In one embodiment, ambient light inside structure 100 reflects off of the passive objects, making them visible in the visible spectrum to the optical sensor. In another embodiment, alternatively or in addition to detecting visible light, the optical sensor, or another sensor, detects reflected light not in the visible spectrum. In this embodiment, each passive object comprises a material that reflects at least infrared light. The optical sensor, or another sensor, comprises an infrared transceiver that transmits infrared light into an area monitored by optical base station 104. The infrared light is reflected by the infrared reflective material on each passive object, back to the optical sensor, or other sensor, where it is converted into electronic signals and processed by optical base station 104. When optical base station 104 determines that one of the passive objects has moved, it may transmit an alarm signal to security system central controller 102, indicating a potential unauthorized entry into structure 100. The alarm signal is typically a wireless, RF signal in one of a variety of well-known wireless protocols, which may comprise an identification of optical base station 104, and identification of a particular passive object that moved, a date and time that the movement occurred, a status of a door or window associated with the movement, etc.

Optical base station 104 monitors one or more of the passive objects mounted to doors and windows of structure 100 to visually determine when they move as a respective door or window is opened or closed. Passive object 106 typically travels in an arc when it is affixed to the location described above, i.e., on a surface of the movable portion of door 106, up high a pie, and away from the door hinges. From the perspective of optical base station 104, passive object 106 may seem to travel somewhat towards optical base station 104 and, depending on placement, on and arc trajectory. Passive object 110, mounted on the sash of window 112, typically travels up and down as the sash is moved. From the perspective of optical base station 104, passive object 110 will generally appear to travel up and down.

In some embodiments, optical base station 104 may be configured to receive status messages from security system central controller 102, indicating a current operating mode of the security system/security system central controller 102. When a status message indicates that the security system/security system central controller 102 is in one of the armed modes, optical base station 104 generally transmits alarm signals when it detects movement of a passive object. In some embodiments, when a status message indicates that the security system/security system central controller 102 is in an off mode, optical base station 104 may either cease transmitting alarm signals when it detects movement of a passive object, may stop monitoring the passive objects, or both.

In one embodiment, optical base station 104 may be configured to activate a security response the need to contact security system central controller 102 and, in some embodiments, security system central controller 102 is not used. In this embodiment, optical base station 104 transmits one or more commands that cause one or more security sirens and/or strobes to activate, transmits one or more messages to a remote monitoring center alerting the monitoring center that a door or a window has been opened, transmits one or more messages to one or more authorized persons, such as a structure owner, renter, etc., indicating that a door or a window has been opened. Of the messages may be transmitted directly to certain receivers, such as one or more sirens or strobe lights, or these and other messages may be transmitted to a local-area network, such as a Wi-Fi network commonly found in homes and businesses. From there, the messages may be routed to their intended destination. Some each optical base station 104 in structure 100 may be used to activate a security response independently of each other and of security system central controller 102.

Figure 2:
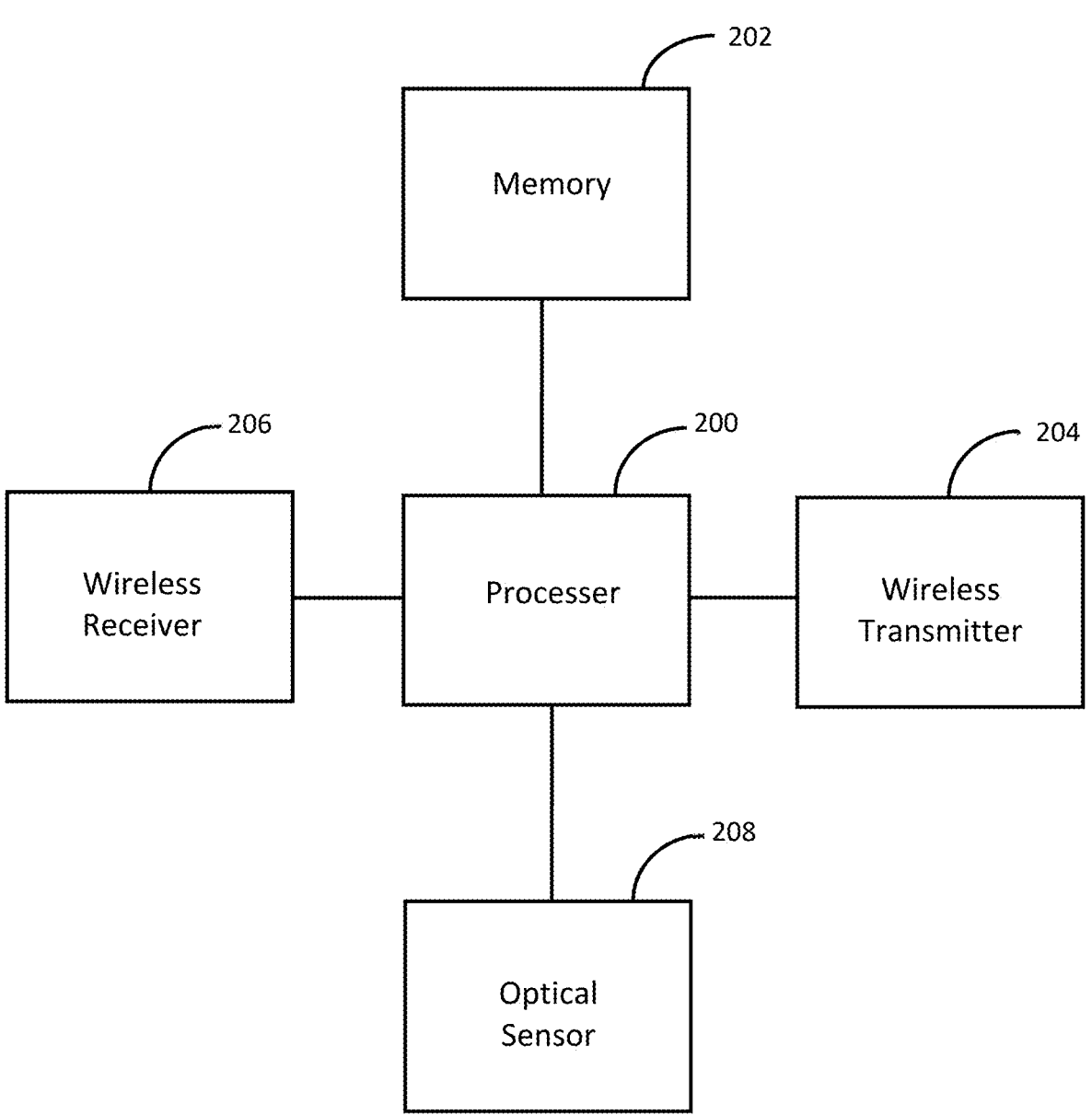
FIG. 2 is a functional block diagram of one embodiment of the optical base station of FIG. 1 in accordance with the teachings herein.

FIG. 2 is a functional block diagram of one embodiment of security system central controller 102 in accordance with the teachings herein. Specifically, FIG. 2 shows processor 200, non-transitory memory 202, transmitter 204, optional wireless receiver 206 (together with transmitter 204, a "transceiver"), and optical sensor 208. It should be understood that the functional blocks may be coupled to one another in a variety of ways, and that not all functional blocks necessary for operation of security system central controller 102 are shown (such as a power supply), for purposes of clarity.

Processor 200 is configured to provide general operation of security system central controller 102 by executing processor-executable instructions stored in memory 202, for example, executable code. Processor 200 typically comprises a microprocessor, microcomputer, microcontroller or custom ASIC, particularly suited for a small, consumer-grade device. In some embodiments, where optical base station is powered, processor 200 may be selected based on its power consumption properties. In some embodiments, processor 200 is packaged alongside other components, such as in the case of a module or system on chip (SoC). An example of this is a Zwave series 800 SoC, part number ZG23 from Silicon Laboratories of San Jose, California.

Non-transitory memory 202 is coupled to processor 200, comprising one or more information storage devices, such as RAM, ROM, flash or other type of electronic, optical, or mechanical memory device. Memory 202 is used to store processor-executable instructions for operation of the 102 as well as any information used by processor 200, such as an identification of each passive object in view of optical base station 104, identification information associated with optical base station 104, etc. After the processor-executable instructions are loaded into processor 200, processor 200 may become a specialized processor for performing a novel and non-obvious method for monitoring entry doors and windows for unauthorized entry. Memory 202 is non-transitory and excludes propagating signals. In some embodiments, memory 202 is packaged along with processor 200, for example, in an embodiment where processor 200 comprises a microcontroller or microcomputer, SoC, etc.

Wireless transmitter 204 is coupled to processor 200, comprising circuitry necessary to wirelessly transmit alarm signals to security system central controller 102 and/or transmit messages indicating that a door for a window has been opened in order to activate a security response. Such circuitry is well known in the art and may comprise one or more of Bluetooth, Zwave, Zigbee, Wi-Fi, RF, optical, ultrasonic circuitry, among others.

Wireless receiver 206 is used in some embodiments, coupled to processor 200, comprising circuitry necessary to receive wireless status messages from security system central controller 102. Such circuitry is well known in the art and may comprise one or more of Bluetooth, Zwave, Zigbee, Wi-Fi, RF, optical, ultrasonic circuitry, among others. In some embodiments, optional wireless receiver 206 is combined with transmitter 204 into a single unit as a "transceiver".

Optical sensor 208 is coupled to processor 200, comprising one or more visual sensors for receiving reflected light from the passive objects mounted to doors and windows in structure 100. In one embodiment, optical sensor 208 comprises a digital camera, capable of receiving visible light and/or light outside the visible light spectrum, such as infrared light. In another embodiment, optical sensor 208 may, additionally or alternatively to a camera, comprise an infrared transceiver configured for transmitting infrared light and receiving reflected infrared light from the passive objects in view of optical base station 104. Optical sensors such as optical sensor 208 are well-known in the art. In any case, optical sensor 208 converts reflected light, either ambient light or infrared light, into electronic signals for processing by processor 200.

Figure 3A:
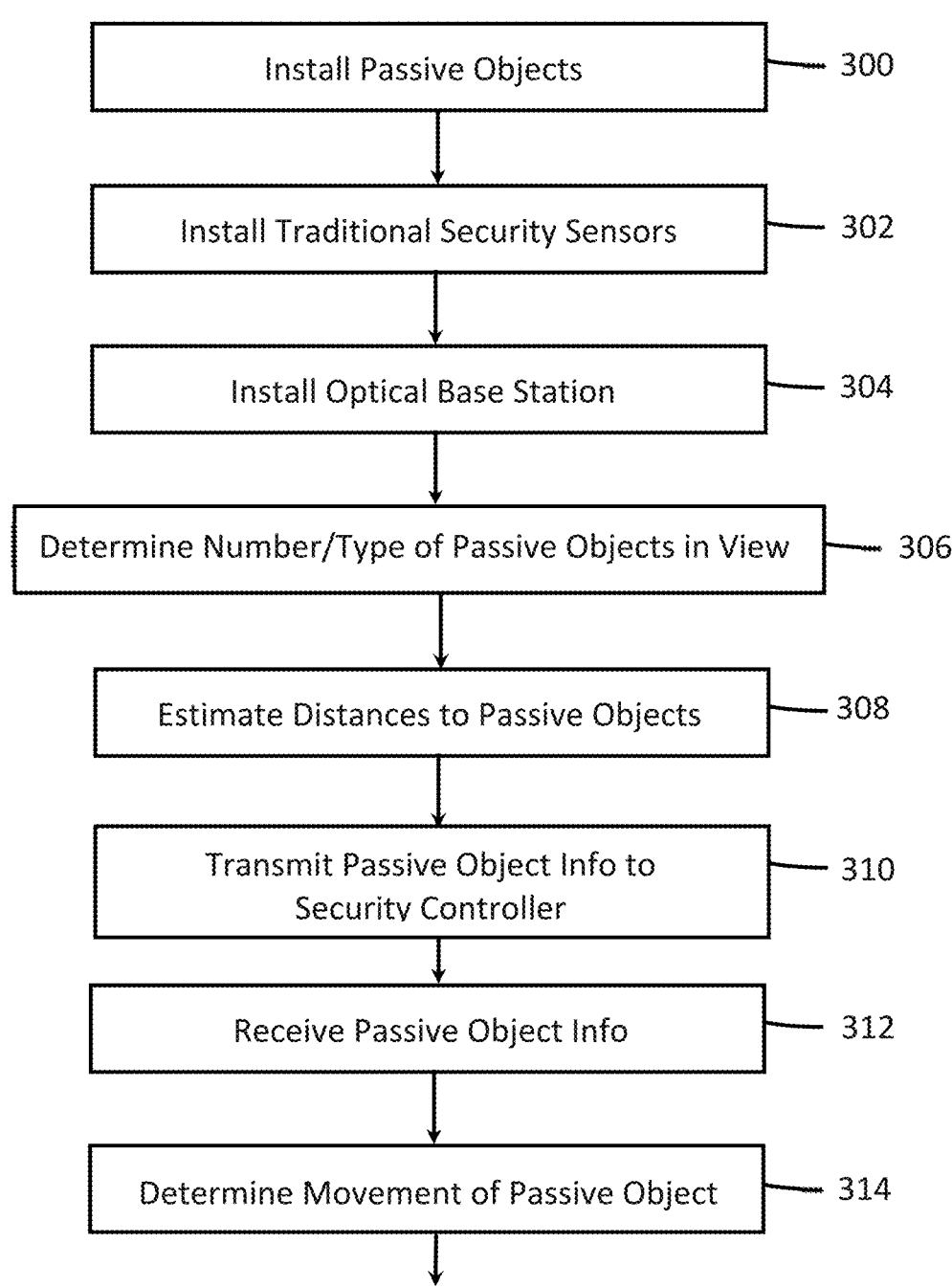
FIGS. 3A-3B are a flow diagram illustrating one embodiment of a method performed by the optical base station of FIGS. 1 and 2, for monitoring entry doors and windows for unauthorized entry as part of a security system.
Figure 3B:
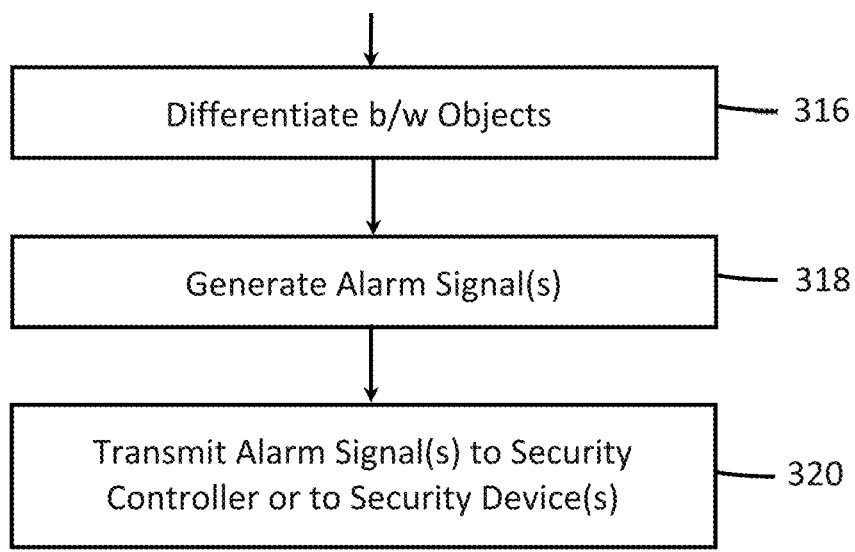

FIGS. A-3B are a flow diagram illustrating one embodiment of a method performed by security system central controller 102, for monitoring entry doors and windows for unauthorized entry as part of a security system. It should be understood that in some embodiments, not all of the steps shown in FIGS. 3A-3B are performed. It should also be understood that the order in which the steps are carried out may be different in other embodiments.

At step 300, one or more passive objects are installed onto doors and/or windows of structure 100, for example, passive object 106 is mounted to a movable portion of door 108 and passive object 108 is So they can someone mounted to a sash of window 112. In this example, passive object 106 comprises a triangular shape with an infrared reflective material thereon, and passive object 110 comprises a circular shape also with an infrared reflective material thereon.

At step 302, one or more traditional, battery-powered sensors may be installed on doors and windows of structure 100, including, in some embodiments, in additional to passive object 106 on door 108 and passive object 110 on the sash of window 112.

At step 304, optical base station 104 is installed, typically on a wall or a ceiling of structure 100, in view of both passive object 106 and passive object 110. Optical base station 104 may be located such that it may access household AC in structure 100 when optical base station 104 is powered by an AC power source. Optical base station 104 may be configured to transmit alarm signals either to security system central controller 102, to a local-area network inside structure 100 and/or directly to certain security devices, such as one or more security sirens or strobe lights.

At step 306, processor 200, via optical sensor 208, may determine a number and, in some embodiments, a geometry, of each passive object in view. For example, when optical sensor 208 comprises a camera or other device with sensitivity to the visible light spectrum, processor 200 may determine the presence of passive object 106 and passive object 110 from ambient light reflected from each passive object. Processor 200 may, alternatively or in addition, determine a passive object geometry, such as the aforementioned triangular shape of passive object 106 and the circular shape of passive object 110, using well-known algorithms applied to the electronic signals from optical sensor 208. In an embodiment where optical sensor 208 comprises an infrared transceiver, processor 200 may determine the presence of any passive objects in view by causing the infrared transceiver to transmit infrared light and determine that one or more passive objects are present when processor 200 receives electronic signals from optical sensor to await indicating a reflection of the infrared light.

At step 308, in one embodiment, processor 200 may estimate a distance that each passive object is away from optical base station 104. In one embodiment, processor 200 determines a distance by measuring a time-of-flight, or a round-trip time, for infrared light transmitted by optical sensor 208.

At step 308, processor 200 may store information regarding the presence of one or more passive objects in view. For example, processor 200 may generate an identification of passive object 106, such as an alphanumeric code, and store the information in memory 202. In one embodiment, processor 200 may also store a geometric trait of a passive object based on a determination by processor 200 of a particular geometric shape of one or more of the passive objects. In one embodiment, processor 200 may also store the estimated distance of each passive object as determined previously. For example, processor 200 may determine that passive object 106 comprises a triangular shape approximately 10 feet 4 inches away from optical base station 104. Processor 200 may then store an identification of passive object 106 in memory 202, in association with the geometric description of the shape of passive object 106, i.e., a triangular shape, and the estimated distance of passive object 106. Similarly, processor 200 may generate a different identification associated with passive object 110 and determine that passive object 110 is 8 feet 3 inches from optical base station 104, comprising a circular geometric shape. Processor 200 may then store the different identification of passive object 110 in memory 202 in association with its geometric description of a circular shape and the estimated distance of passive object 110.

At step 310, processor 200 may cause transmitter 206 to transmit information regarding any passive objects detected. This may occur as processor 200 identifies new passive objects, or it may occur based on a learning or enrollment protocol between security system central controller 102 and optical base station 104. In one embodiment, the information may comprise the identification information generated for each passive object, a geometric shape of each passive object and an estimated distance away from optical base station 104 for each passive object.

At step 312, the information transmitted by optical base station 104, indicating the presence of one or more passive objects and associated information is received by security system central controller 102 and may be stored in a memory thereof for later reference.

At step 314, while optical base station 104 is monitoring the passive objects in view, in this example, passive object 106 and passive object 110, processor 200 may determine when one or both sensors is moved by processing the electronic signals from optical sensor 208. A passive object may be moved as a door or window sash is opened or closed by a person entering or leaving structure 100. In this example, it will be assumed that processor 200 has determined that passive object 106 has moved in response to someone opening the door 108.

Processor 200 determines movement using one or more techniques. In one embodiment, processor 200 uses a time-of-flight technique, i.e., by measuring the round-trip time between infrared light transmitted by optical sensor 208 and the time that a reflected infrared signal is received by processor 200 via optical sensor to 208. For example, processor 200 may initially determine that passive object 106 is 10 feet, 4 inches away from optical base station 104 when door 108 is in a closed position based on a first round-trip time of infrared light transmitted by optical sensor 208. Processor 200 may then determine that passive object 106 is further or closer away than the initial determination, after sending out an additional infrared light "ping". Processor 200 may then determine that passive object 106 has moved when the distance between the initial distance and a later, secondary distance, has changed.

In another embodiment, when optical sensor 208 comprises a camera or other light-sensitive device, processor 200 may determine movement of a passive object or object recognition executable instructions stored in memory 202. Such techniques are well-known in the art. These techniques may determine differences in images provided by optical sensor 208 as electronic signals.

At step 316, processor 200 may differentiate between passive object 106 and passive object 110 using one or more techniques. In one embodiment, where optical sensor 208 comprises an infrared transceiver, processor 200 may differentiate between passive object 106 and passive object 110 using the time-of-flight techniques previously discussed. For example, if processor 200 previously determined that passive object 106 is 10 feet 4 inches from optical base station 104, and passive object 110 is 8 feet 3 inches from base station 104, and processor 200 determines that the time-of-flight between passive object 106 has changed, processor 200 determines that passive object 106 has moved, rather than passive object 110.

At step 318, in response to determining that one of the passive objects has moved, in this example, passive object 106, processor 200 generates an alarm signal, the alarm signal comprising an identification of passive object 106 as having been moved and, in some embodiments, a geometric description of a shape of passive object 106, in this case, a triangular shape. In one embodiment, the estimated distance away from optical base station 104 may also be provided. In one embodiment, the alarm signal is transmitted to security system central controller 102, and security system central controller 102 may cause a security response to occur. In another embodiment, in addition or alternatively to transmitting the alarm signal to security system central controller 102, processor 200 generates and transmits one or more alarm signals either to a local-area network within structure 100, such as a Wi-Fi network, and/or directly to a security device within structure 100, such as one or more security sirens and/or security strobe lights.

At step 320, in one embodiment, security system central controller 102 receives the alarm signal and, in response, may cause a security response when the security system/ security system central controller 102 is in one of the armed modes of operation. In another embodiment, one or more security sirens and/or security strobe lights may receive an alarm signal from optical base station 104 and, in response, may activate a native function therein, such as emitting a piercing siren and/or causing an intense light to flash, respectively. An alarm message may, alternatively or in addition, be received by a remote monitoring station and/or a personal communication device of an authorized person associated with structure 100 and the security system.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A system for monitoring entry doors and windows for unauthorized entry, comprising:
   a passive object configured for installation onto an entry door, and
   an optical base station configured for visually monitoring the passive object and for determining, based upon a determined change in distance between the optical base station and the passive object, when the passive object has moved.

2. The system of claim 1, wherein the passive object comprises an infra-red reflective tape.

3. The system of claim 1, wherein the passive object comprises a first geometric shape.

4. The system of claim 1, further comprising a second passive object configured for installation onto a window panel;
   wherein the optical base station is configured for visually monitoring the second passive object and for determining, based upon a sensed change in distance between the optical base station and the second passive object, when the second passive object has moved.

5. The system of claim 4, wherein the passive object comprises a first geometric shape and the second passive object comprises a second geometric shape;
   wherein the optical base station is configured to identify the door as being opened when the base station detects that the first geometric shape has moved and to identify the window as being opened when the optical base station detects that the second geometric shape has moved.

6. The system of claim 1, further comprising:
   a central security controller configured for causing a security response to occur when the security system is in an armed state and an alarm signal is received from the optical base station indicating that the passive object has moved.

7. The system of claim 1, further comprising:
   a central security controller configured for transmitting a status message to the optical base station when an operating mode of the security system has been changed, indicative of a present operating state;
   wherein the optical base station is further configured to transmit an alarm signal to the central security controller indicating that the passive object has moved, and further configured to receive the status message and to refrain from transmitting further alarm signals when the status message indicates that the security system is in an off mode.

8. The system of claim 6, further comprising:
   a plurality of battery-powered security sensors located throughout a structure where the optical base station is located, each of the battery-powered security sensors configured to send an alert to the security system central controller when a door or a window of the structure is opened;
   wherein the security system central controller is further configured to receive the alerts from the battery-powered security sensors and to cause the security response only when an alarm signal from the optical base station is received within a predetermined time of receiving and alert from 1 of the battery-powered security sensors.

9. An optical base station, comprising:
   an optical sensor configured to generate electronic signals indicative of a viewing area of the optical sensor;
   a processor, coupled to the optical sensor, configured to receive the electronic signals from the optical sensor and to determine, based on the electronic signals, a presence of a passive object in the viewing area of the optical sensor and further configured to determine, based on the electronic signals indicating a change in distance between the optical base station and the passive object, when the passive object has moved.

10. The optical base station of claim 9, further comprising:
   a wireless transmitter coupled to the processor;
   wherein the processor is further configured to generate an alarm signal when the passive sensor moves, and the transmitter is configured to transmit the alarm signal to a security system central controller.

11. The optical base station of claim 9, further comprising:
   a wireless receiver coupled to the processor, configured to receive a status message from a security system central controller, the status message indicating a mode of operation of the security system central controller;

11

12 wherein the processor is further configured to transmit a security alert only when the status message has indicated that the security system is in an armed mode.

12. A method, performed by an optical base station, for monitoring entry doors and windows for unauthorized entry, comprising:

generating, by an optical sensor of the optical base station, electronic signals indicative of a viewing area of the optical sensor;

providing the electronic signals to a processor of the optical base station;

determining, based on the electronic signals, a presence of a passive object in the viewing area of the optical sensor; and determining, based on the electronic signals indicating a change in distance between the optical base station and the passive object, when the passive sensor has moved.

13. The method of claim 12, further comprising:

generating an alarm signal when the electronic signals indicate that the passive sensor has moved; and transmitting the alarm signal to a security system central controller.

14. The method of claim 13, further comprising:

receiving a status message from a security system central controller via a wireless receiver of the optical base station, the status message indicating a mode of operation of the security system central controller; and transmitting a security alert to the security system central controller only when the status message has indicated that the security system is in an armed mode.

*   *   *   *   *